US011385913B2

(12) United States Patent
Harvin et al.

(10) Patent No.: US 11,385,913 B2
(45) Date of Patent: *Jul. 12, 2022

(54) SERVER-BASED GENERATION OF USER INTERFACES FOR DELIVERY TO MOBILE COMMUNICATION DEVICES

(71) Applicant: DEVICEATLAS LIMITED, Dublin (IE)

(72) Inventors: Trey Harvin, County Dublin (IE); Ronan Cremin, Dublin (IE); John Leonard, Dublin (IE)

(73) Assignee: DEVICEATLAS LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,160

(22) Filed: Jun. 11, 2020

(65) Prior Publication Data

US 2021/0064395 A1 Mar. 4, 2021

Related U.S. Application Data

(63) Continuation of application No. 15/160,995, filed on May 20, 2016, now Pat. No. 10,705,862, which is a (Continued)

(30) Foreign Application Priority Data

Jul. 8, 2010 (GB) .................................... 1011545

(51) Int. Cl.
*G06F 9/451* (2018.01)
*G06F 3/0482* (2013.01)

(52) U.S. Cl.
CPC ............ *G06F 9/452* (2018.02); *G06F 3/0482* (2013.01)

(58) Field of Classification Search
CPC ...... G06F 3/048; G06F 3/0481; G06F 3/0482; G06F 3/0488; G06F 9/451
See application file for complete search history.

(56) References Cited

U.S. PATENT DOCUMENTS

| 5,884,246 A | 3/1999 | Boucher et al. |
| 6,112,192 A | 8/2000 | Capek |

(Continued)

FOREIGN PATENT DOCUMENTS

| AU | 2008203506 | 8/2008 |
| CN | 201181942 | 1/2009 |

(Continued)

OTHER PUBLICATIONS

"Class: tera_wurfl," devel.teratechnologies.net, Oct. 2006, 6 pages [Mar. 18, 2007 content retrieved from: web.archive.org/web/20070318033439/http://devel.teratechnologis.net/tera-wurfl/doc/tera_wurfl/tera_wurfl.html].

(Continued)

*Primary Examiner* — Cao H Nguyen
(74) *Attorney, Agent, or Firm* — Sheridan Ross P.C.

(57) ABSTRACT

An interface generator 6 generates a user interface for a mobile communication device 2 by providing, at step S2, a menu of functional components to a website owner 5 and receiving an indication of which of the functional components are selected for inclusion in the user interface from the website owner, at step S3. When the interface generator 6 receives a request for the user interface from the mobile communication device 2, at step S7, it delivers the user interface to the mobile communication device, at step S8, for display by the mobile communication device 2. The generated user interface includes the selected functional components and selection of a functional component included in the displayed user interface by a user of the mobile com- (Continued)

munication device 2 causes the mobile communication device 2 to carry out a task.

29 Claims, 3 Drawing Sheets

Related U.S. Application Data continuation of application No. 13/177,376, filed on Jul. 6, 2011, now abandoned.

(56) References Cited

U.S. PATENT DOCUMENTS

| | | | |
|---|---|---|---|
| 6,421,733 | B1 | 7/2002 | Tso et al. |
| 6,546,397 | B1 | 4/2003 | Rempell |
| 6,565,609 | B1 | 5/2003 | Sorge et al. |
| 6,611,876 | B1 | 8/2003 | Barrett et al. |
| 6,613,098 | B1 | 9/2003 | Sorge et al. |
| 6,615,212 | B1 | 9/2003 | Dutta et al. |
| 6,662,218 | B2 | 12/2003 | Mighdoll et al. |
| 6,684,369 | B1 | 1/2004 | Bernardo et al. |
| 6,747,365 | B2 | 1/2004 | Reinold et al. |
| 6,760,711 | B1 | 7/2004 | Gillett et al. |
| 6,888,837 | B1 | 5/2005 | Cunningham et al. |
| 6,925,595 | B1 | 8/2005 | Whitledge et al. |
| 6,938,067 | B2 | 8/2005 | Hershenson |
| 6,944,665 | B2 | 9/2005 | Brown et al. |
| 6,957,394 | B1 | 10/2005 | Fernandez et al. |
| 7,072,810 | B2 | 7/2006 | Ramanathan et al. |
| 7,089,295 | B2 | 8/2006 | Christfort et al. |
| 7,120,702 | B2 | 10/2006 | Huang et al. |
| 7,178,101 | B2 | 2/2007 | Tunning |
| 7,305,453 | B2 | 12/2007 | Awamoto et al. |
| 7,373,347 | B2 | 5/2008 | Takahashi et al. |
| 7,388,844 | B1 | 6/2008 | Brown et al. |
| 7,414,743 | B2 | 8/2008 | Komaki |
| 7,457,846 | B2 | 11/2008 | Baldwin et al. |
| 7,478,329 | B2 | 1/2009 | Stevens et al. |
| 7,584,423 | B2 | 9/2009 | Rohrabaugh et al. |
| 7,584,486 | B2 | 9/2009 | Cheng et al. |
| 7,603,657 | B2 | 10/2009 | Gassner et al. |
| 7,739,658 | B2 | 6/2010 | Watson et al. |
| 7,823,083 | B2 | 10/2010 | Rohrabaugh et al. |
| 7,827,312 | B2 | 11/2010 | Ramaswamy et al. |
| 7,904,455 | B2 | 3/2011 | Chiu et al. |
| 7,962,640 | B2 | 6/2011 | Lee |
| 7,970,801 | B1 | 6/2011 | Defrang et al. |
| 7,971,240 | B2 | 6/2011 | Guo et al. |
| 8,010,702 | B2 | 8/2011 | Farouk |
| 8,041,346 | B2 | 10/2011 | Tyhurst et al. |
| 8,081,956 | B2 | 12/2011 | Aaltonen et al. |
| 8,156,205 | B1* | 4/2012 | Forsberg .................. G06F 16/26 709/220 |
| 8,291,408 | B1* | 10/2012 | Czymontek ............... G06F 8/34 717/178 |
| 8,396,990 | B2 | 3/2013 | Cremin et al. |
| 8,694,925 | B1* | 4/2014 | Beust ...................... G06F 40/14 715/866 |
| 9,141,724 | B2 | 9/2015 | Cremin |
| 9,185,182 | B2 | 11/2015 | Pearce |
| 9,535,572 | B2* | 1/2017 | Lee ...................... G06F 3/0482 |
| 9,804,861 | B2* | 10/2017 | Sundaresan ............. G06F 9/451 |
| 2002/0003547 | A1 | 1/2002 | Wang et al. |
| 2002/0091582 | A1 | 7/2002 | Palmer et al. |
| 2002/0103881 | A1 | 8/2002 | Grande et al. |
| 2002/0133545 | A1* | 9/2002 | Fano ...................... H04L 67/16 709/203 |
| 2002/0190876 | A1 | 12/2002 | Lai et al. |
| 2002/0198937 | A1 | 12/2002 | Diwan et al. |
| 2003/0004984 | A1 | 1/2003 | Chou |
| 2003/0061288 | A1 | 3/2003 | Brown et al. |
| 2003/0061299 | A1 | 3/2003 | Brown et al. |
| 2003/0097454 | A1 | 5/2003 | Yamakawa et al. |
| 2003/0172186 | A1 | 9/2003 | Dunn et al. |
| 2003/0229718 | A1 | 12/2003 | Tock et al. |
| 2004/0015567 | A1 | 1/2004 | Ziebold et al. |
| 2004/0024781 | A1 | 2/2004 | Youd |
| 2004/0117197 | A1 | 6/2004 | Dutta et al. |
| 2004/0148571 | A1 | 7/2004 | Lue |
| 2004/0205621 | A1 | 10/2004 | Johnson et al. |
| 2004/0205650 | A1 | 10/2004 | Cheng |
| 2004/0228343 | A1 | 11/2004 | Molteni et al. |
| 2004/0229654 | A1 | 11/2004 | Farcasiu |
| 2004/0255244 | A1 | 12/2004 | Filner et al. |
| 2004/0267610 | A1 | 12/2004 | Gossett et al. |
| 2005/0015365 | A1 | 1/2005 | Kavacheri et al. |
| 2005/0015474 | A1 | 1/2005 | Kavacheri et al. |
| 2005/0160065 | A1 | 7/2005 | Seeman |
| 2005/0188361 | A1 | 8/2005 | Cai et al. |
| 2005/0234864 | A1 | 10/2005 | Shapiro |
| 2005/0235256 | A1 | 10/2005 | Freydl |
| 2005/0246627 | A1 | 11/2005 | Sayed |
| 2006/0015358 | A1 | 1/2006 | Chua |
| 2006/0036767 | A1 | 2/2006 | Ryan |
| 2006/0059153 | A1 | 3/2006 | Lassalle |
| 2006/0143335 | A1 | 6/2006 | Ramamoorthy et al. |
| 2006/0230100 | A1 | 10/2006 | Shin et al. |
| 2007/0016577 | A1 | 1/2007 | Lasa et al. |
| 2007/0027672 | A1 | 2/2007 | Decary et al. |
| 2007/0061486 | A1 | 3/2007 | Trinh et al. |
| 2007/0083810 | A1 | 4/2007 | Scott et al. |
| 2007/0168465 | A1 | 7/2007 | Toppenberg et al. |
| 2007/0176796 | A1 | 8/2007 | Bliss et al. |
| 2007/0220423 | A1 | 9/2007 | Charbonneau et al. |
| 2007/0288841 | A1 | 12/2007 | Rohrabaugh et al. |
| 2007/0294646 | A1 | 12/2007 | Timmons |
| 2008/0022374 | A1 | 1/2008 | Brown et al. |
| 2008/0028335 | A1 | 1/2008 | Rohrabaugh et al. |
| 2008/0059498 | A1 | 3/2008 | Carus et al. |
| 2008/0065980 | A1 | 3/2008 | Hedbor |
| 2008/0071857 | A1 | 3/2008 | Lie |
| 2008/0077855 | A1 | 3/2008 | Lev et al. |
| 2008/0176544 | A1 | 7/2008 | Holdsworth |
| 2008/0201452 | A1 | 8/2008 | Athas et al. |
| 2008/0235566 | A1 | 9/2008 | Carlson et al. |
| 2008/0288475 | A1 | 11/2008 | Kim et al. |
| 2009/0043798 | A1 | 2/2009 | Tan et al. |
| 2009/0077202 | A1 | 3/2009 | Pitts |
| 2009/0089448 | A1 | 4/2009 | Sze et al. |
| 2009/0089668 | A1 | 4/2009 | Magnani et al. |
| 2009/0094137 | A1 | 4/2009 | Toppenberg et al. |
| 2009/0210514 | A1 | 8/2009 | Davis et al. |
| 2009/0300111 | A1 | 12/2009 | Rana |
| 2009/0319778 | A1 | 12/2009 | Rzepecki et al. |
| 2010/0005310 | A1 | 1/2010 | Gentry et al. |
| 2010/0017464 | A1 | 1/2010 | Cheng et al. |
| 2010/0017502 | A1 | 1/2010 | Cheng et al. |
| 2010/0043017 | A1 | 2/2010 | Paul et al. |
| 2010/0095024 | A1 | 4/2010 | Wyler et al. |
| 2010/0106565 | A1 | 4/2010 | Manesh et al. |
| 2010/0114982 | A1 | 5/2010 | Ferrell et al. |
| 2010/0138317 | A1 | 6/2010 | Kennedy |
| 2010/0146413 | A1 | 6/2010 | Yu |
| 2010/0161394 | A1 | 6/2010 | Bell et al. |
| 2010/0174974 | A1 | 7/2010 | Brisebois et al. |
| 2010/0199195 | A1 | 8/2010 | Carounanidy et al. |
| 2010/0199197 | A1 | 8/2010 | Faletski et al. |
| 2010/0299395 | A1 | 11/2010 | Klassen |
| 2011/0078120 | A1 | 3/2011 | Tyhurst et al. |
| 2011/0099467 | A1 | 4/2011 | Kapur et al. |
| 2011/0107227 | A1 | 5/2011 | Rempell et al. |
| 2011/0202842 | A1* | 8/2011 | Weatherly ................. G06F 8/38 715/716 |
| 2011/0231782 | A1 | 9/2011 | Rohrabaugh et al. |
| 2011/0289316 | A1 | 11/2011 | Cremin et al. |
| 2011/0295895 | A1 | 12/2011 | Musgrove et al. |
| 2011/0296294 | A1 | 12/2011 | Bhadury et al. |
| 2011/0307776 | A1 | 12/2011 | Cremin |
| 2012/0011446 | A1 | 1/2012 | Harvin et al. |
| 2012/0036494 | A1 | 2/2012 | Gurumohan et al. |
| 2012/0060087 | A1 | 3/2012 | Jame et al. |
| 2013/0055071 | A1 | 2/2013 | Bray |

(56) References Cited

U.S. PATENT DOCUMENTS

| | | | | |
|---|---|---|---|---|
| 2014/0109046 | A1* | 4/2014 | Hirsch | G06F 8/60 717/120 |
| 2016/0070796 | A1 | 3/2016 | Pearce | |
| 2017/0017499 | A1 | 1/2017 | Harvin et al. | |

FOREIGN PATENT DOCUMENTS

| | | |
|---|---|---|
| EP | 0940960 | 9/1999 |
| EP | 1376990 | 1/2004 |
| EP | 1641211 | 3/2006 |
| EP | 1923798 | 5/2008 |
| EP | 2077521 | 7/2009 |
| GB | 2445667 | 7/2008 |
| WO | WO 98/56159 | 12/1998 |
| WO | WO 01/22683 | 3/2001 |
| WO | WO 01/30043 | 4/2001 |
| WO | WO 01/88733 | 11/2001 |
| WO | WO 02/087135 | 10/2002 |
| WO | WO 2004/040481 | 5/2004 |
| WO | WO 2004/088951 | 10/2004 |
| WO | WO 2006/008559 | 1/2006 |
| WO | WO 2007/089320 | 8/2007 |
| WO | WO 2007/137166 | 11/2007 |
| WO | WO 2008/073207 | 6/2008 |
| WO | WO 2009/012461 | 1/2009 |
| WO | WO 2009/036318 | 3/2009 |
| WO | WO 2009/047783 | 4/2009 |
| WO | WO 2009/051471 | 4/2009 |

OTHER PUBLICATIONS

"Device Description Landscape," W3C, Feb. 2006, 19 pages [retrieved from: www.w3.org/TR/2006/WD-dd-landscape-20060210/].

"Diagram of WURFL Tree Structure," referred to in opposition to EP 2245836, dated Jul. 5, 2017.

"MySQL 3.23, 4.0, 4.1 Reference Manual," MySQL AB, Mar. 2, 2007, 7 pages.

"MySQL 3.23, 40., 4.1 Reference Manual," MySQL AB, Mar. 2, 2007, 27 pages.

"Provisioning System for Mobile Communication Devices," IP.com Prior Art Database Technical Disclosure, IP.com No. 000126668, Aug. 10, 2005, 2 pages.

"So, what can the WURFL do for me?" wurfl.sourceforge.net, 2002, 3 pages [Mar. 12, 2007 content retrieved from web.archive.org/web/20070312003800/http://wurfl.sourceforge.net:80/whatcanwurfldo.php].

"Source Code and Documentation for Tera-WURFL," devel.teratechnologies.net, generated Oct. 2006, 18 pages [retrieved from: web/archive.org/web/20070320171455/http://devel.teratechnologies.net/tera-wurfl/].

"Tera-WURFL Database Dump and Screenshots," Anonymous, Dec. 8, 2016, 3 pages.

"Tera-WURFL README," devel.teratechnologies.net, Oct. 2006, 1 page [Mar. 20, 2007 content retrieved from: web.archive.org/web/20070320171516/http://devel.teratechnologies.net/tera-wurfl/doc/ric_README.html].

"WURFL and Perl: Simple Perl WURFL Parser WURFLLite," wurfl.sourceforge.net, 2002, 1 page [Mar. 19, 2007 content retrieved from: web.archive.org/web/20070319205834/http://wurfl.sourceforge.net:80/perl/index.php].

"WURFL: WAP Universal Resource File," Sourceforge.net, Oct. 21, 2002, [retrieved on Nov. 12, 2012], 31 pages. Retrieved from: http://web.archive.org/web/20021021032915/http://wurfl.sourceforge.net/.

"What's the WURFL? WURFL = WAP Universal Resource File," wurfl.sourceforge.net, captured Oct. 21, 2002, 30 pages [retrieved from: web.archive.org/web/20021021165358/http://wurfl.sourceforge.net/backgroundinfo.php].

"What's the WURFL? WURFL = Wireless Universal Resource File," wurfl.sourceforge.net, 2002, 2 pages [Mar. 13, 2007 content retrieved from: web.archive.org/web/20070313231636/http://wurfl.sourceforge.net:80/backgroundinfo.php].

"What's cool about the WURFL?" wurfl.sourceforge.net, 2002, 2 pages [Mar. 12, 2007 content retrieved from: web.archive.org/web/20070312030813/http://wurfl.sourceforge.net:80/smart.php].

"WURFL," wurfl.sourceforge.net, captured 2007, 53 pages [retrieved from: web.archive.org/web/20070304190242/http://wurfl.sourceforge.net/smart.php].

Aho et al., Data Structures and Algorithms, Bell Telephone Laboratories, Inc., 1983, pp. 162-169.

Comer, "Heuristics for Trie Index Minimization," Feb. 1977, 24 pages.

Comer "The Ubiquitous B-Tree," Computing Surveys, Jun. 1979, vol. 11, No. 2, pp. 121-137.

ESPN, Dec. 12, 2007, Internet Archive, http://web.archive.org/web/20071212030046/http://espn.go.com, 3 pages.

Kamerman "Source for file tera_wurfl.php," devel.teratechnologies.net, Oct. 2006, 6 pages [Mar. 20, 2007 content retrieved from: web.archive.org/web/20070320171455/http://devel.teratechnologis.net/tera-wurfl/doc_filesource/fsource_tera_wurfl_tera_wurfl.php.html].

Kamerman "Source for file tera_wurfl_parser.php," devel.teratechnologies.net, Oct. 2006, 5 pages [Mar. 23, 2007 content retrrieved from: web.archive.org/web/20070323194318/http://devel.teratechnologies.net/tera-wurfl/doc/_filesource/fsource_tera_wurfl_admintera_wurfl_parser.php.html].

Kent et al. "Encyclopedia of Microcomputers: vol. 7—Evolution of Computerized Maintenance management to Generation of Random Numbers," Marcel Dekker, Inc., 1991, pp. 209-213.

Nelson, "Fast string searching with Suffix Trees," published Aug. 1, 1996, at http://marknelson.us/1996/08/01/suffix-trees, 11 pages.

Parziale et al., "TCP/IP Tutorial and Technical Overview (IBM Redbook)," IBM Redbooks, Dec. 2006, at http://www.redbooks.ibm.com/redbooks/pdfs/gg243376.pdf, pp. 426-480.

Passani "Welcome to the WURFL the Wireless Universal Resource File," wurfl.sourceforge.net, 2002, 2 pages [Mar. 10, 2007 content retrieved from: web.archive.org/web/20070310025034/http://wurfl.sourceforge.net:80/index.php].

Passani "WURFL FAQ, Part 1: General about WURFL," wurfl.sourceforge.net, 2002, 6 pages [Mar. 15, 2007 content retrieved from: web.archive.org/web/20070315082531/http://wurfl.sourceforge.net:80/faq1php].

Passani "WURFL and Java: the obvious match," wurfl.sourceforge.net, 2002, 2 pages [Mar. 3, 2007 content retrieved from: web.archive.org/web/20070303115051/http://wurfl.sourceforge.net:80/java/index.php].

Passani "WURFL Java API," wurfl.sourceforge.net, 2002, 3 pages [Mar. 3, 2007 content retrieved from: web.archive.org/web/20070303113656/http://wurfl.sourceforge.net:80/java/api.php].

Passani et al. "Wireless Universal Resource File," wurfl.sourceforge.net, last updated Feb. 2007, 51 pages [Mar. 8, 2007 content retrieved from: web.archive.org/web/20070308144255/http://wurfl.sourceforge.net/wurfl.xml].

Trevor et al., "From Desktop to Phonetop: A UI for Web Interaction on Very Small Devices," Proceedings of the 14th Annual ACM Symposium on User Interface Software and Technology, 2001, at http://jonathantrevor.net/trevor/papers/uist2001.pdf, pp. 121-130.

International Search Report for International (PCT) Patent Application No. PCT/GB/2009/000401, dated Mar. 5, 2010.

Written Opinion for International (PCT) Patent Application No. PCT/GB209/000401, dated Mar. 5, 2010.

Search Report for UK Patent Application No. GB082585.0, dated Jun. 23, 2008, 4 pages.

International Search Report for International (PCT) Patent Application No. PCT/GB2009/002420, dated Mar. 3, 2010, 4 pages.

Written Opinion for International (PCT) Patent Application No. PCT/GB2009/002420, dated Mar. 3, 2010, 5 pages.

International Search Report for International (PCT) Patent Application No. PCT/EP2011/058137, dated Jul. 18, 2011, 3 pages.

Written Opinion for International (PCT) Patent Application No. PCT/EP2011/058137, dated Jul. 18, 2011, 5 pages.

Third Party Observation filed Dec. 17, 2012 for European Patent Application No. EP 20090710546, 8 pages.

(56) References Cited

OTHER PUBLICATIONS

Third Party Observations for European Patent Application No. 09710546.4, dated Feb. 2, 2015, 4 pages.
Third Party Observation filed Dec. 19, 2016 for European Patent Application No. 09710546.4, dated Dec. 19, 2016, 8 pages.
Opposition to European Patent No. 2245836, dated Jul. 5, 2017, 39 pages.
Official Action for U.S. Appl. No. 12/760,205, dated Feb. 21, 2012 20 pages.
Official Action for U.S. Appl. No. 12/760,205, dated Jul. 17, 2012 17 pages.
Notice of Allowance for U.S. Appl. No. 12/760,205, dated Nov. 6, 2012, 5 pages.
Notice of Allowance for U.S. Appl. No. 12/760,205, dated Dec. 19, 2012, 2 pages.
Official Action for U.S. Appl. No. 12/762,521, dated Jul. 11, 2012 21 pages.
Official Action for U.S. Appl. No. 12/762,521, dated Jan. 11, 2013, 20 pages.
Official Action for U.S. Appl. No. 12/762,521, dated Sep. 5, 2013, 20 pages.
Official Action for U.S. Appl. No. 12/762,521, dated May 5, 2014, 19 pages.
Notice of Allowance for U.S. Appl. No. 12/762,521, dated May 15, 2015, 8 pages.
Official Action for U.S. Appl. No. 12/783,424, dated Jul. 23, 2012 12 pages.
Official Action for U.S. Appl. No. 12/867,465, dated Jan. 31, 2012 12 pages.
Official Action for U.S. Appl. No. 12/867,465, dated Aug. 27, 2012 12 pages.
Official Action for U.S. Appl. No. 12/867,465, dated Dec. 26, 2012, 13 pages.
Official Action for U.S. Appl. No. 12/867,465, datede Jul. 15, 2013, 13 pages.
Official Action for U.S. Appl. No. 12/867,465, dated Feb. 27, 2014, 13 pages.
Official Action for U.S. Appl. No. 12/867,465, dated Sep. 12, 2014, 14 pages.
Notice of Allowance for U.S. Appl. No. 12/867,465, dated Jul. 2, 2015, 16 pages.
Official Action for U.S. Appl. No. 14/925,743, dated Jan. 27, 2017 23 pages.
Official Action for U.S. Appl. No. 14/925,743, dated Nov. 3, 2017 25 pages.
Official Action for U.S. Appl. No. 14/925,743, dated May 31, 2018 27 pages.
Official Action for U.S. Appl. No. 14/925,743, dated Mar. 7, 2019 23 pages.
Official Action for U.S. Appl. No. 14/925,743, dated Sep. 19, 2019 23 pages.
Official Action for U.S. Appl. No. 13/123,378, dated Dec. 14, 2012, 17 pages.
Official Action for U.S. Appl. No. 13/123,378, dated May 10, 2013, 16 pages.
Official Action for U.S. Appl. No. 13/123,378, dated Aug. 19, 2014, 17 pages.
Official Action for U.S. Appl. No. 13/177,376, dated Jan. 28, 2014, 19 pages.
Official Action for U.S. Appl. No. 13/177,376, dated Oct. 6, 2014, 14 pages.
Official Action for U.S. Appl. No. 15/160,995, dated May 31, 2018 13 pages.
Official Action for U.S. Appl. No. 15/160,995, dated Jan. 10, 2019 12 pages.
Official Action for U.S. Appl. No. 15/160,995, dated Oct. 4, 2019 11 pages.
Notice of Allowance for U.S. Appl. No. 15/160,995, dated Feb. 25, 2020 8 pages.
Official Action for U.S. Appl. No. 14/925,743, dated Apr. 1, 2020 25 pages.
Official Action for U.S. Appl. No. 14/925,743, dated Aug. 6, 2020 23 pages.
Official Action for U.S. Appl. No. 14/925,743, dated Feb. 4, 2021 27 pages.

\* cited by examiner

SERVER-BASED GENERATION OF USER INTERFACES FOR DELIVERY TO MOBILE COMMUNICATION DEVICES

This application is a continuation of U.S. patent application Ser. No. 15/160,995, filed May 20, 2016, which is a continuation of U.S. patent application Ser. No. 13/177,376, filed Jul. 6, 2011, which claims the benefit of United Kingdom Application No. 1011545.9 filed Jul. 8, 2010, the entire disclosures of which are incorporated by reference herein.

FIELD OF THE INVENTION

The present invention relates to the generation of user interfaces for mobile communication devices. In particular, but not exclusively, the present invention relates to the generation of a user interface that is delivered to a mobile communication device over a mobile communications network for display by the mobile communication device.

BACKGROUND TO THE INVENTION

Mobile communication devices are increasingly used for far more than telephone calls. Over recent years in particular, mobile communication devices have been provided with a larger and larger range of functionality. Organisations are under pressure to utilise this functionality to communicate with potential customers, i.e. the users of mobile communication devices.

For example, mobile communication devices increasingly provide access to the internet. An organisation which has an internet presence, such as a website, is therefore able to communicate with users of mobile communication devices through the internet. Advantageously, many organisations have existing websites, meaning that it is not necessary for them to expend resources to communicate with their customers in this way.

However, access to the internet on mobile communication devices can be cumbersome. The connection to the internet on a mobile communication device is typically relatively slow compared to fixed connections, and the compact nature of mobile communication devices can lead to difficulty in manipulating web pages designed for home or laptop computers. Moreover, mobile communication devices are often simply unable to display some web-based content, such as that created in Adobe Flash.

In order to overcome these difficulties, an organisation may wish to offer a mobile version of its website. A mobile version of a website is optimised for display on a mobile communication device. For example, large images in the original website may be removed and the layout of the website may be optimised for mobile viewing. In this way, it is possible to overcome some of the problems of viewing the internet on a mobile communication device. However, for full optimisation different mobile versions of a web site would have to be created for the differing capabilities of each mobile communication device.

One way in which mobile versions of websites can be created is through a "transcoding" service. Transcoding services automatically convert conventional web sites into mobile versions suitable for viewing on a mobile communication device. In some cases, transcoding services run "on-the-fly" (i.e. as content is downloaded), meaning that it is possible to optimise the result according to the requirements of the mobile communication device requesting the content.

Transcoding services allow organisations to provide a wide range of content to customers who use appropriate mobile communication devices. However, there are limits to the functionality of such services. In particular, although the service may remove and rearrange elements of the website, the website was fundamentally designed for viewing in its original state. That is to say, the website was not designed for viewing or manipulation on a mobile communication device.

Moreover, websites, whether transcoded or not, do not necessarily make use of all the capabilities of the mobile communication device. That is to say, while they may provide content to users, they do not allow organisations to utilise the full capabilities of the mobile communication device when communicating with their customers.

One way in which an organisation may harness the capabilities of mobile communication devices is to provide a software application that can be loaded on to the device. Users of mobile communication devices may typically download such software applications from an "application store" accessible from their mobile communication device. This allows users to customise the functions they wish to have available on their mobile communication device, and also allows the organisation which provides the software application to utilise the hardware abilities of the mobile communication device in a manner which was previously the sole preserve of the manufacturer of the mobile communication device. An increasing proportion of mobile communication devices sold today are so-called "smart phones" in which the ability to download software applications is seamlessly integrated.

One advantage of such applications is that they are designed for the mobile communication device on which they function. This allows the user interface of the applications to be designed with the mobile communication device in mind. For example, if the mobile communication device has a touch screen the user interface may comprise large icons for selection by the user. In this way, a user may access information easily.

However, these developments bring their own complications. For example, there are a range of mobile communication devices available, and typically an application written for one mobile communication device will not function on another. As such, an organisation must provide separate versions of the application for each mobile communication device, or at least for each operating system running on the available mobile communication devices. This is a burden and creates a barrier to entry into the marketplace.

This barrier to entry is especially acute for organisations whose core business is not information technology, since the expertise to program an application for a single type of mobile communication device, let alone for many types, may not be available. Larger companies or corporations may be able to overcome this barrier by employing contractors to create applications for them, but this may be prohibitively expensive for small and medium sized enterprises.

As a result, while a wide range of organisations are able to communicate with users of mobile communication devices through the internet, a smaller proportion of organisations are able to harness the full capabilities of such devices. It would be beneficial to both users of mobile communication devices and the organisations themselves if more organisations were able to access these capabilities.

SUMMARY OF THE INVENTION

According to a first aspect of the present invention, there is provided an apparatus for generating a user interface for a mobile communication device, the apparatus comprising a server configured to:

generate a web resource providing a menu of functional components;

receive an indication that one or more of the functional components in the menu is/are selected for inclusion in the user interface;

generate the user interface including the selected functional component(s) based on the received indication;

receive a request for the user interface from the mobile communication device; and deliver the user interface to the mobile device for display by the mobile communication device, wherein selection of a functional component included in the displayed user interface by the user of the mobile communication device causes the mobile communication device to carry out a task.

According to a second aspect of the present invention, there is provided a method for generating a user interface for a mobile communication device, the method comprising the steps of:

generating a menu of functional components;

receiving an indication that one or more of the functional components is/are selected for inclusion in the user interface;

generating the user interface including the selected functional component(s) based on the received indication;

receiving a request for the user interface from the mobile communication device; and delivering the user interface to the mobile communication device for display by the mobile communication device;

wherein selection of a functional component included in the displayed user interface by a user of the mobile communication device causes the mobile communication device to carry out a task.

So, the present invention allows a user interface to be generated and delivered to a mobile communication device. For example, an organisation that wishes to communicate with a user of a mobile communication device may use the present invention to generate an appropriate user interface. As the functional components in the user interface can be selected from a menu of functional components, the organisation can select bespoke functionality for the user interface according to their needs, with no requirement to individually program each aspect of the user interface. This modular approach to generating a user interface can allow a greater range of organisations to take advantage of the capabilities of the mobile communication device than would otherwise be the case.

In some preferred embodiments, the menu of functional components is generated in dependence on one or more characteristics of a requesting entity. For example, the requesting entity may be a web site owner that wishes to cause the generation of a user interface allowing the user to access content regarding the services that it offers. Accordingly, some functional components may be of greater value to the requesting entity than others, depending, for example, on the activities or geographical location of the requesting entity. It is therefore beneficial that the menu of functional components depends on such characteristics of the requesting entity. For example, if a requesting entity is a restaurant, the menu of functional components may be generated to include functional components that are of value to those in the catering industry and may present the functional components in an order appropriate to that industry.

The menu of functional components may present the functional components in a number of ways. For example, components in the menu may be organised alphabetically or by popularity. Moreover, the functional components may be provided in separate sections according to subject matter, or a price category for including the functional component in the user interface.

According to preferred embodiments of the present invention, the server is configured to analyse an existing web resource, and to include content from the existing web resource in the generated user interface. In this manner, the wide range of existing web resources and the content contained therein can be harnessed by generating user interfaces using this content. As such, users of mobile communication devices may access this content in a manner that is more effective and user-friendly than attempting to access the web resource directly from the mobile communication device.

For example, a web resource may be a web page hosted at an IP address associated with internet domain name "www"".bobspizzashop.""com". This web page may be unsuitable for viewing on a mobile communication device. For example, the web page may include large images or objects encoded using Adobe Flash or Java script which cannot be displayed by the mobile communication device. However, the web page may include content that is of interest to a user of the mobile communication device. For example, the user of the mobile communication device may wish to make a telephone call to the owner of the web page and the web page may include the necessary telephone number. Preferred embodiments of the present invention allow the generation of a user interface relating to the web page that may be retrieved by the mobile communication device. The user interface may include functional components that can be selected by the user to cause the mobile communication device to perform tasks. These tasks may take advantage of content in the web page, such as the address or telephone number of the owner of the web page.

Preferably, the user interface is stored at an IP address associated with an internet domain name that shares one or more elements with an internet domain name of the existing web resource. For example, if the internet domain name of the existing web resource is "www" ".bobspizzashop.""com" then the user interface may be stored at an IP address associated with the internet domain name "www"".bobspizzashop.""mobi". This assists users of the mobile communication device in locating the user interface. In preferred embodiments, the user interface is stored at an IP address associated with an internet domain name that shares a main distinctive element with the domain name of the existing web resource. In the example given, the main distinctive element is "bobspizzashop". Preferably, the user interface is stored at an IP address associated with an internet domain name which is identical to the internet domain name of the existing web resource save for the addition or replacement of a top level domain.

In preferred embodiments, the server is configured to receive a further indication that one or more of the functional components in the menu is/are selected for inclusion in the user interface and to update the user interface to include the selected functional component(s) based on the received further indication. This allows a user interface to be maintained after it has been generated. For example, the functional components in the user interface can be changed by indicating as such in the further indication.

Preferably, the server is configured to request a payment in dependence on the selected functional component(s). For example, the level of payment requested may depend on the number of functional components selected. For example, there may be a price associated with each functional component, such that selecting that functional component adds that price to the level of payment requested. This model can be used to encourage third parties, which may be termed component providers, to develop functional components that may be included in the generated user interface, because each time a functional component developed by a third party is selected the third party may receive a payment according to the price associated with that functional component. In this way, the capabilities and level of functionality of potential user interfaces is increased, giving organisations the tools they need to communicate effectively with the users of mobile communication devices.

The task may comprise initiating an application hosted by the mobile communication device. For example, a variety of applications may already be loaded on to the mobile communication device and offer varying functionality. The task may initiate one of these applications, thereby allowing the user interface to harness this existing functionality. The applications are typically software applications, but one skilled in the art will recognise that they may also be held in firmware. In general, the task may comprise activating existing functionality of the mobile communication device. Examples of such functionality are discussed below.

In a preferred embodiment, the user interface is displayed by a first application hosted by the mobile communication device, and the task comprises initiating a second application hosted by the mobile communication device. The second application is different from the first application. In a preferred embodiment, the first application may be an internet browser. In this case, the user interface may be delivered as a web page or other web resource. Accordingly, the user of the mobile communication device may access the user interface using an internet browser, but may initiate applications other than the internet browser by selecting one of the functional components included in the user interface. In other embodiments, the functional component may be "self-contained" such that it is not necessary to initiate any second application.

In a preferred embodiment, the task comprises initiating a telephone call. For example, the user may select one of the functional components and thereby cause a telephone call to be made to the owner of the web page at "www"".bobspizzashop."".com". In this way, the user interface allows information that can be derived from the existing web page to be integrated with functionality of the mobile communication device such as making a telephone call. Even if the mobile communication device were able to display the existing web page correctly, the ability of the functional components to initiate tasks such as this offer superior functionality to the user than simply viewing the web page.

In a preferred embodiment, the task comprises displaying a location on a map. To do this, the task may, for example, initiate an application on the mobile communication device which displays maps. Again, this provides superior functionality to the user than the mere ability to view the existing web resource.

In preferred embodiment, the task comprises creating an email. To do this, the task may, for example, initiate an application on the mobile communication device which allows the user to send emails. In a preferred embodiment, the task may create such an email ready for the user to alter or send. In particular, the "to" field of the email may be automatically completed by the task. For example, the "to" field may be automatically completed by an email address that has been extracted by analysing the original web resource.

In some preferred embodiments, the task may comprise retrieving a form that may be completed by the user. As such, a form designed to allow the user to return information to the owner of the existing web resource may be provided, easing communication between the user and the owner of the existing web resource. For example, the form may be an order form or a booking form.

In some preferred embodiments, the task may comprise retrieving and displaying the existing web resource. That is to say, that when the user selects a functional component, this causes the mobile communication device to retrieve and display the existing web resource. As such, the user interface provides a mechanism by which the user can access the original web resource if the functional components in the user interface are found not to meet the user's requirements. Alternatively, the one or more tasks may comprise retrieving and displaying a mobile version of the web resource. That is to say, that when the user selects a functional component, this causes the mobile communication device to retrieve and display a mobile version of the existing web resource. As such, the user may access a version of the web resource which has been optimised for the mobile communication device and does not include elements which cannot be displayed by the mobile communication device.

Preferably, each functional component is represented by a graphical element within the user interface, each graphical element being displayed in an array. The graphical element may be an icon. As such, the user of the mobile communication device is presented with an easily comprehended array of functional components. The array provides an aesthetically pleasing display of the functional components for access by the user, and also allows the user interface to be generated within the relatively simple to manage parameters of placing functional components in pre-defined positions in an array.

One or more of the functional components may be a link, such as a hyperlink. In particular, the link may be a link to an/the existing web resource.

Use of the words "system", "server", mobile communication device" and so on are intended to be general rather than specific. Whilst these features of the invention may be implemented using an individual component, such as a computer or a central processing unit (CPU), they can equally well be implemented using other suitable components or a combination of components. For example, the invention could be implemented using a hard-wired circuit or circuits, e.g. an integrated circuit, or using embedded software. It can also be appreciated that the invention can be implemented, at least in part, using computer program code. According to another aspect of the present invention, there is therefore provided computer software or computer program code adapted to carry out the method described above when processed by a computer processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

A preferred embodiment of the invention is described below, by way of example only, with reference to the accompanying drawings.

DETAILED DESCRIPTION

Figure 1:
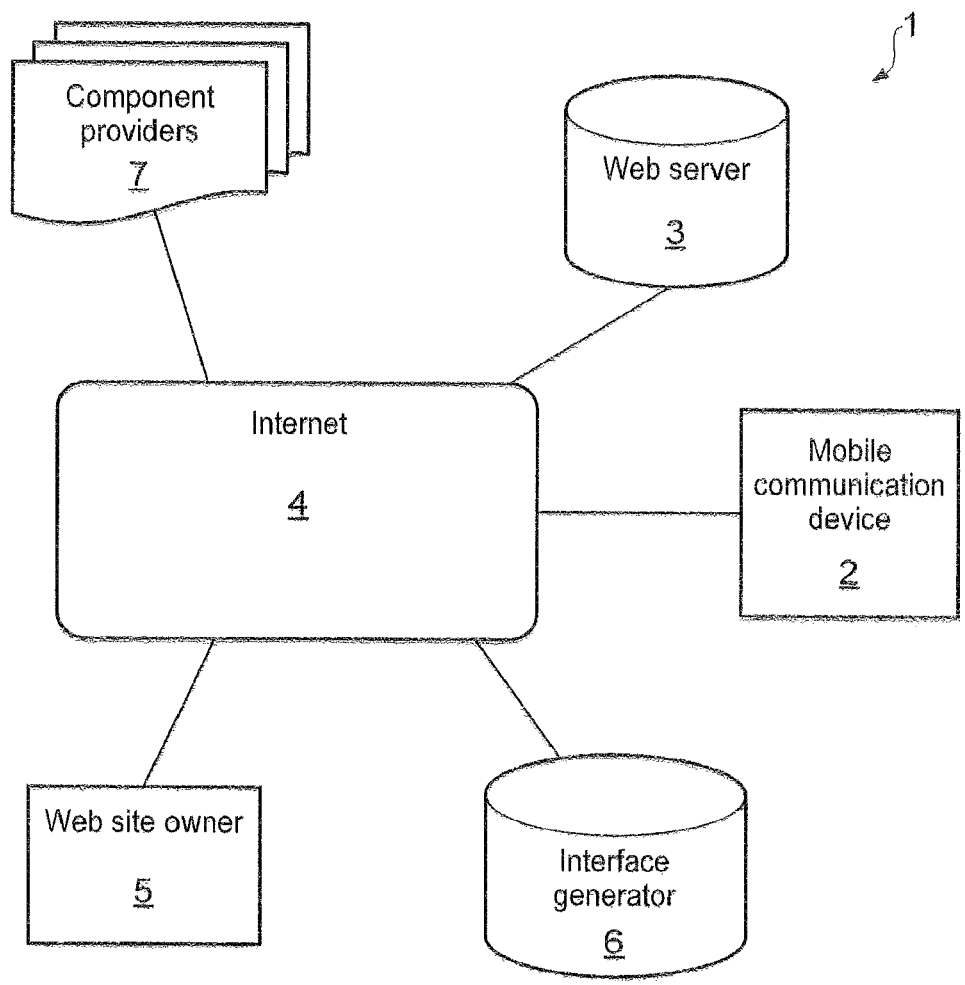
FIG. 1 is a schematic illustration of a communications system.

Referring to FIG. 1, a communications system 1 comprises a mobile communication device 2, such as a mobile telephone, smart phone, Personal Digital Assistant (PDA) or such like, that may retrieve a web resource from a web server 3 across the internet 4. The web resource is hosted on the web server 3 on behalf of a web site owner 5.

The mobile communication device 2 is typically connected to the internet 4 by a mobile communication network (not shown), such as a terrestrial or satellite mobile communication network. In other examples, the mobile communication device 2 uses a Wireless Local Area Network (WLAN) or such like to connect to the internet 4 instead of a mobile communication network. The mode of connection to the internet 4 is inessential, but the mobile communication device 2 itself is usually characterised by limitations in its ability to use web resources intended for use by desktop and laptop personal computers (PCs). As such, although the mobile communication device 2 may retrieve a web resource from the web server 3, it may not be capable of displaying the web resource correctly or adequately.

Web resources include web sites, web pages, feeds, data or video files and so on. In the illustrated example, a web page intended for use by PCs is stored at a web server 3. The web page is part of a web site under the control of the web site owner 5. In this example, the web server 3 is also under the control of the web site owner 5, but in other examples, the web server 3 may be controlled by another party, such as an Internet Service Provider (ISP), on behalf of the web site owner 5.

The communications system 1 further comprises an interface generator 6. This is typically implemented using a conventional server, but may be put into effect using other processing means as appropriate. The interface generator 6 is designed to present a menu of available functional components to the web site owner 5 for inclusion in a user interface. The web site owner 5 may then choose from the available functional components, and the interface generator 6 then generates a user interface using the chosen functional components.

The available functional components presented to the web site owner 5 by the interface generator 6 may be provided by the interface generator 6 itself, or may be provided by third parties. In this regard, the communications system 1 further comprises component providers 7 for providing functional components. In the communications system 1 shown in FIG. 1, the component providers 7 are connected to the interface generator 6 via the internet 4. However, this is not essential, and components may be provided from component providers 7 to the interface generator 6 via some other means.

The component providers 7 may retain the functional components themselves, with the interface generator 6 retrieving them when required to generate a particular user interface. Alternatively, the component providers 7 may provide the functional components to the interface generator 6 for storage. In fact, a combination of these techniques may be used for different functional components, and a given functional component may be distributed between the interface generator 6 and the component providers 7. For example, resource data for a given functional component may be held by the component provider 7 while the interface generator 6 stores the functional component itself.

The content and presentation of the menu of available functional components that the interface generator 6 presents to the web site owner 5 may vary according to a number of factors. For example, certain functional components may be available to a given web site owner 5 on the basis of details regarding that web site owner 5, such as nationality or the type of business the web site owner 5 represents.

In some examples, the user interface generated by the interface generator 6 may relate to web resources hosted on the web server 3. For example, the interface generator 6 may generate a user interface using content from a web page intended for use by PCs that is hosted by the web server 3. In order to generate a user interface in this way, the interface generator 6 may have the capability to analyse existing web resources, such as those hosted on web server 3.

Once generated, the interface generator 6 may store the user interface. The interface generator 6 may then deliver the user interface to the mobile communication device 2 on receipt of a request for the user interface from the mobile communication device 2. By retrieving the user interface from the interface generator 6, the mobile communication device 2 may have access to the content of the web resource used to generate the user interface without the need to access the web resource itself.

Exemplary functional components that can be included in a user interface by the interface generator 6 are described in more detail below with reference to FIG. 2. In general, functional components in a user interface can be selected by the user of the mobile communication device 2 to cause the mobile communication device 2 to carry out one or more tasks. These tasks may or may not utilise the content from a web resource that was used in the generation of the user interface.

Consider the example of a web site owner 5 who has established a web page for PCs hosted at an IP address associated with the internet domain name "www"".bobspizzashop.""com". This IP address is the address of the web server 3 where the web page is hosted. If a user of the mobile communication device 2 wishes to access the web page, the mobile communication device 2 may retrieve the web page from the web server 3 across the internet 4. However, the mobile communication device 2 may not have the capabilities to correctly display all or part of the web page properly. For example, the web page may include objects encoded in Adobe Flash or Java script, and the mobile communication device 2 may not have the ability to display such objects.

The web page at "www"".bobspizzashop.""com" relates to a restaurant belonging to the web site owner 5. The content in the web page may include details such as the opening times, the menu, the telephone number and the address of the restaurant. These details may be of interest to a user of the mobile communication device 2, but the mobile communication device 2 may be unable to properly display the web page.

So, the web page at "www"".bobspizzashop.""com" is an ineffective way for the web site owner 5 to communicate with the user of the mobile communication device 2. According to the present invention, the web site owner 5 may instead communicate with the user of the mobile communication device 2 via a user interface generated by the interface generator 6.

In order that the web site owner 5 has control over the user interface generated by the interface generator 6, the interface generator 6 presents a list of a viable functional components to the web site owner 5. The functional components chosen by the web site owner 5 are then included when the interface generator 6 generates the user interface. In generating the user interface, the interface generator 6 may use content from the web page at "www"".bobspizzashop.""com". The interface generator 6 then stores the user interface. For example, the interface generator 6 may store the user interface at an IP address associated with internet domain name "www"".bobspizzashop.""mobi". As such, the mobile communication device 2 may browse to the internet domain name "www"".bobspizzashop.""mobi" to access the user interface relating to the web page at internet domain name "www"".bobspizzashop.""com". This user interface is designed for display on the mobile communication device 2.

As well as being designed for use by the mobile communication device 2, the user interface may take greater advantage of the functionality of the mobile communication device 2 in a manner which the web page at "www"".bobspizzashop.""com" did not. In particular, the user of the mobile communication device 2 may select functional components within the user interface to cause the mobile communication device 2 to carry out tasks. These tasks may reflect the range of capability of the mobile communication device 2 while utilising content in the web page at "www"".bobspizzashop.""com" which has been used when generating the user interface.

Figure 2:
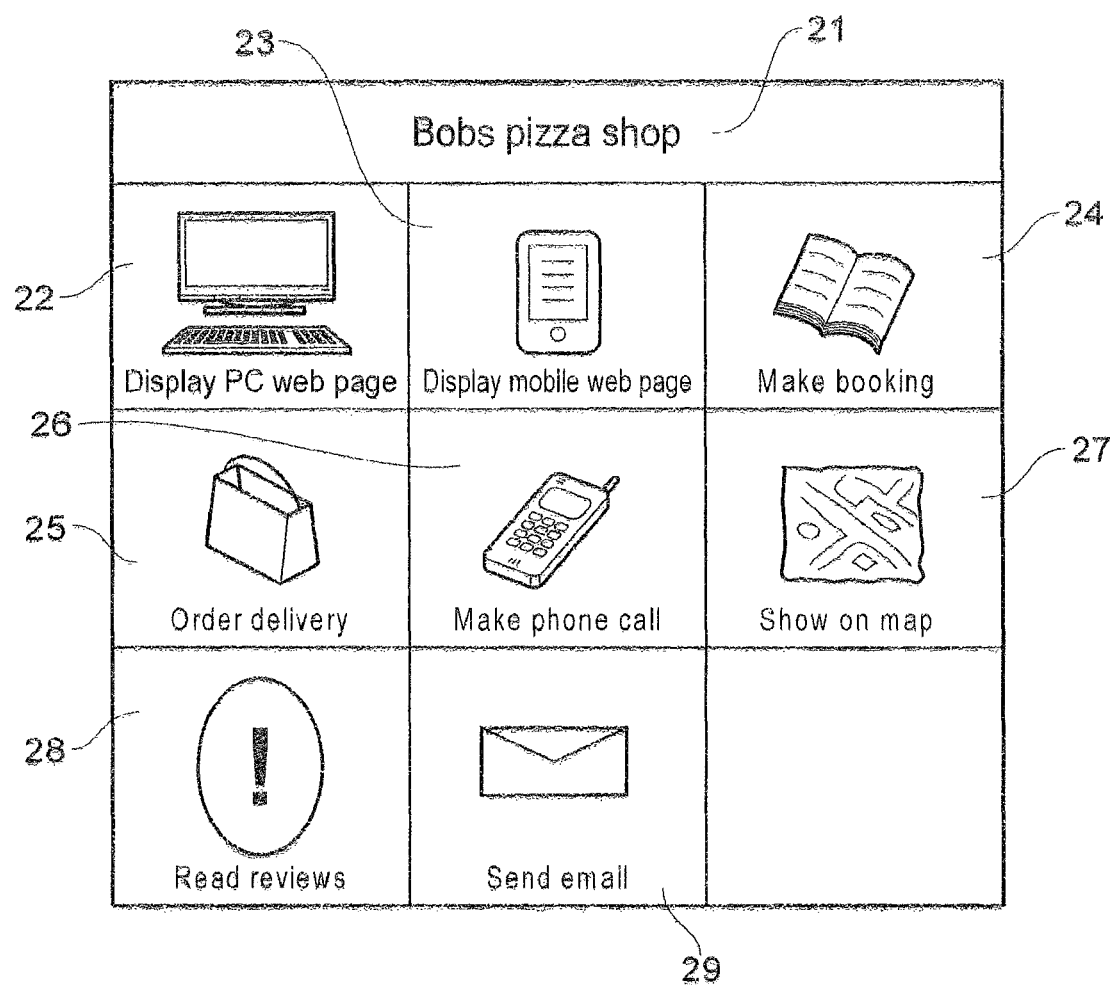
FIG. 2 shows an illustrative example of a user interface when displayed on a mobile communication device.

FIG. 2 shows an exemplary user interface based on the web page at "www"".bobspizzashop.""com" as it would be displayed by the mobile communication device 2.

The user interface comprises a title 21 and a number of functional components 22-29. The title is displayed at the top of the user interface and may comprise content from the web page at "www"".bobspizzashop.""com". The functional components 22-29 are each represented by graphical elements. The graphical elements are arranged in a two-dimensional array. In the example shown, the graphical element representing each functional component 22-29 comprises an icon and a brief description. The user interface is displayed on the mobile communication device 2 as shown in FIG. 2, and the user of the mobile communication device 2 may select one or more of the functional components 22-29 according to their requirements. The functional components 22-29 in FIG. 2 are just examples of functional components 22-29 that may be incorporated into the user interface. One skilled in the art will recognise that other functional components could additionally or alternatively be incorporated. As described below, when the user selects a functional component 22-29 it causes the mobile communication device 2 to carry out one or more tasks.

The first functional component 22 is entitled "view PC web page". This functional component 22 allows the user of the mobile communication device 2 to access the web page intended for PCs hosted at an IP address associated with the internet domain name "www"".bobspizzashop.""com". As such, the task carried out by the mobile communication device 2 in response to the selection of the first functional component 22 by the user is the retrieval and display of the web page at "www"".bobspizzashop.""com". As mentioned previously, the display of the web page on the mobile communication device 2 may be imperfect because of the different capabilities of the mobile communication device 2 and the PCs for which the web page is designed.

The second functional component 23 illustrated in FIG. 2 is entitled "view mobile web page". The second functional component 23 allows the user of the mobile communication device 2 to access a mobile version of the web page hosted at the IP address associated with the internet domain name "www"".bobspizzashop.""com". As such, the task carried out by the mobile communication device 2 in response to the selection of the second functional component 23 by the user is the retrieval and display of a mobile version of the web page at "www"".bobspizzashop.""com". The mobile version is a version of the web page that has been adapted for viewing on the mobile communication device 2. For example, the web site owner 5 may provide a separate web page which is designed for viewing on the mobile communication device 2. In another example, the interface generator 6 may be arranged to transcode the web page at "www"".bobspizzashop.""com" so that it is appropriate for the mobile communication device 2. That is, when the user of the mobile communication device 2 selects the second functional component 23, a request is sent to the user interface generator 6 for a mobile version of the web page at "www"".bobspizzashop.""com". The user interface generator 6 then retrieves the web page from the web server 3, transcodes the web page so that it is appropriate for the mobile communication device 2, and delivers the transcoded web page to the mobile communication device 2.

The third functional component 24 illustrated in FIG. 2 is entitled "make booking". This allows a user of the mobile communication device 2 to make a booking at the restaurant associated with the web page at "www"".bobspizzashop.""com". As such, the task carried out by the mobile communication device 2 in response to the selection of the third functional component 24 is the retrieval of a booking form. For example, if the user selects the third functional component this may cause the mobile communication device 2 to send a request to one of the component providers 7 for a booking form, allowing the user to specify details such as the time/date and the number of guests for which the user would like to make a reservation at the restaurant associated with the web site at "www"".bobspizzashop.""com". The mobile communication device 2 may then return the booking form to the relevant component provider which may make its own arrangements to validate the booking with the web site owner 5.

A fourth functional component 25 illustrated in FIG. 2 is entitled "order delivery". This allows the user of the mobile communication device to order a meal to be delivered by the restaurant associated with the web page at "www"".bobspizzashop.""com". As such, the task carried out by the mobile communication device 2 in response to the selection of the fourth functional component 25 by the user is the retrieval of an order form. For example, if the user selects the fourth functional component 25 this may cause the mobile communication device 2 to send a request to one of the component providers 7 for an order form. The order form may include a list of items that can be ordered from the restaurant and a field for the user to enter their address. Once completed, the order form may be transmitted to the component provider 7 which provided the order form and that component provider 7 may make its own arrangements to ensure that the order is properly received and processed by the web site owner 5.

The fifth functional component 26 illustrated in FIG. 2 is entitled "make phone call". The fifth functional component 26 allows the user to make a telephone call to the web site owner 5 from the mobile communication device 2. As such, the task carried out by the mobile communication device 2 in response to the selection of the fifth functional component 26 by the user is the initiation of a telephone call to the web site owner 5. If the user selects the fifth functional component 26 then the mobile communication device automatically initiates a phone call to the web site owner 5, who in the illustrated example is also the proprietor of the restaurant associated with the web page at "www" ".bobspizzashop.""com". The user is then able to make enquiries of the web site owner 5 as required. For example, the user may make a reservation at the restaurant or order a meal to be delivered.

The sixth functional component 27 illustrated in FIG. 2 is entitled "show on map". This allows the user to cause the mobile communication device to display a map illustrating the location of the restaurant associated with the web page at "www"".bobspizzashop.""com". As such, the task carried out by the mobile communication device 2 in response to the selection of the sixth functional component 26 by the user is the display of a location on a map. For example, if the user selects the sixth functional component 27 this may cause the mobile communication device to send a request to one of the component providers 7 for a map illustrating the location of the restaurant associated with the web page at "www"".bobspizzashop.""com". However, in an alternative and preferred embodiment, the mobile communication device 2 does not request a map from a component provider 7 when the user selects the sixth functional component 27, but instead uses details of the address of the restaurant with a map application which is already hosted by the mobile communication device 2, thereby allowing the display of the location of the restaurant to the user. The details of the address can be obtained because content from the web page at "www"".bobspizzashop.""com" was used to generate the user interface. In some preferred embodiments, the map application may also be able to display to the user directions from their current location to the restaurant.

The seventh functional component 28 illustrated in FIG. 2 is entitled "read reviews". This allows the user of the mobile communication device 2 to view reviews of the restaurant associated with the web page at "www"".bobspizzashop.""com". As such, the task carried out by the mobile communication device 2 in response to the selection of the seventh functional component 28 by the user is the retrieval and display of reviews relating to the web site owner 5. These reviews might be contained in an independent web page hosted at, for example, an IP address associated with the internet domain name "www" ".restaurantreviews.""com". If the user selects the seventh functional component 28, then a request may be made to retrieve a web page from "www" ".restaurantreviews.""com" and this web page may then be displayed to the user.

The eighth functional component 29 illustrated in FIG. 2 is entitled "send email". This allows the user of the mobile communication device 2 to send an email to the web site owner 5. As such, the task carried out by the mobile communication device 2 in response to the selection of the eighth functional component 29 by the user is the generation of an email. For example, if the user selects the eighth functional component 29 this may cause an email application hosted by the mobile communication device 2 to be initiated. Moreover, the email address of the web site owner is automatically included in the "to" field of a new email which is automatically generated in the email application. The email address of the web site owner 5 has been obtained during analysis of the web page at "www" ".bobspizzashop.""com" and used in the generation of the user interface. As such, the user need only fill in the content of the email and send the email to contact the web site owner 5.

As mentioned above, the functional components 22-29 shown in FIG. 2 are only examples of those that may be made available to the web site owner 5 by the interface generator 6. The skilled person will recognise that a large range of alternative functional components may additionally or alternatively be provided. Indeed, an advantage of the communications system 1 shown in FIG. 1 is that new types of functional components may be added to the available functional components as the system 1 develops. Moreover, the new types of functional components can be introduced not only by the interface generator 6 but also by the component providers 7.

Figure 3:
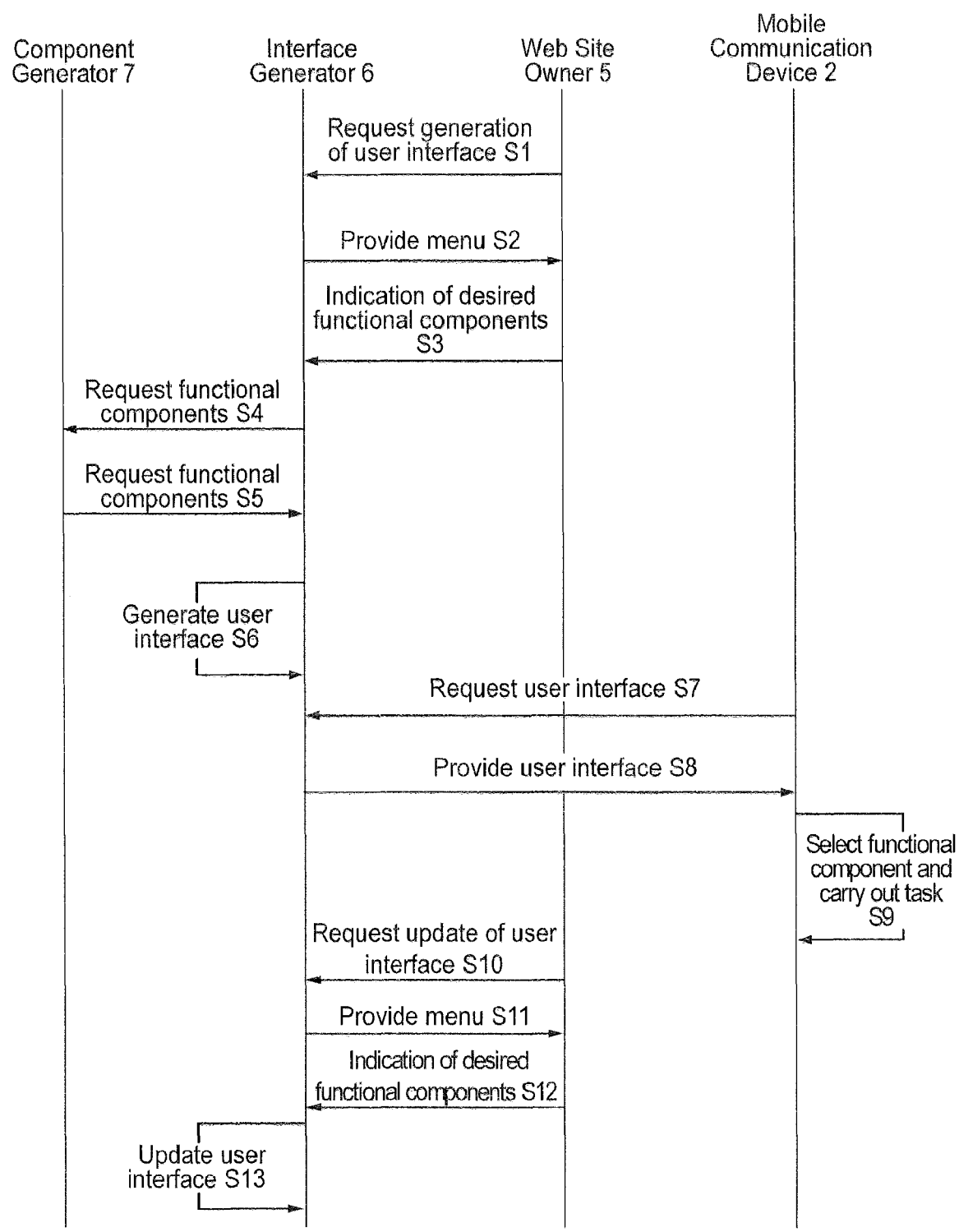
FIG. 3 is a sequence diagram illustrating the generation of a user interface and its subsequent delivery to a mobile communication device.

As mentioned previously, the user interface illustrated in FIG. 2 is generated by the interface generator 6. The steps by which the generation of the user interface occur are illustrated in FIG. 3.

At step S1, the web site owner sends a request for the generation of a user interface to the interface generator 6. The request may include details of an existing web resource belonging to the web site owner (such as the web page at "www"".bobspizzashop.""com"), such as the IP address of the web resource. Moreover, the web site owner 6 may specify an internet domain name at which it would like the user interface to be accessible. For example, the web site owner responsible for the web site at "www"".bobspizzashop.""com" may wish the user interface to be accessible at internet domain name "www"".bobspizzashop.""mobi". In this case, the interface generator 6 will register the internet domain name "www"".bobspizzashop.""mobi" with its own IP address so that it will receive requests directed to that domain name.

On receiving a request for a user interface from the web site owner 5, the interface generator 6 can analyse the web page at "www"".bobspizzashop.""com". In this process, the interface generator may be able to locate such content as the title of the web page, a phone number, an address, an email address and so on. This content is stored for later use in generating the user interface.

The interface generator 6 then generates a menu of functional components. This menu represents the available functional components that could be included in a user interface relating to the web page at "www"".bobspizzashop.""com". The functional components may be of the types described above with reference to FIG. 2 or may be of different types as required. The menu of functional components can be generated in dependence on the results of the analysis by the interface generator 6 of the web page at "www"".bobspizzashop.""com". For example, it may be that functional components are only available if the necessary content has been identified in the web page by the interface generator 6 during this analysis. In one instance, a functional component which is designed to cause the mobile communication device 2 to make a telephone call to the web site owner 5 will not be available if a relevant telephone number has not been identified in the web page.

At step S2, the interface generator 6 provides the menu of functional components to the web site owner 5. The web site owner 5 can then select which functional components it would like to be included in the user interface. This decision may be made on the basis of presentational considerations or the type of services the web site owner 5 wishes to offer to its customers. Moreover, the decision may be made on the basis of financial considerations. For example, the user interface generator 6 may charge for the service of generating a user interface, and this charge may depend on the functional components selected by the web site owner 5 for the user interface. Similarly, this charging structure can provide an incentive for component providers 7 to develop functional components for inclusion in user interfaces as they can receive all or part of the charge levied to the web site owner 5 for including a functional component that they have developed.

The menu of functional components may be tailored towards the web site owner 5. That is to say, the functional components in the menu of functional components may depend on one or more characteristics of the web site owner 5. For example, different functional components may be appropriate to different web site owners which carry out different businesses or are located in different geographical regions. More subtly, characteristics of the web site owner 5 may affect the manner in which functional components are presented in the menu of functional components (for example, by altering the order of the functional components) without actually adding or removing any functional components to or from the menu.

Having made a decision as to which functional components to include in the user interface, the web site owner 5 returns an indication of this decision to the interface generator, at step S3. That is to say, the interface generator receives from the web site owner 5 an indication that one or more of the functional components in the menu is/are selected for inclusion in the user interface.

Once the interface generator 6 has received the indication of which functional components are to be included in the user interface, it can request, at step S4, those functional components that are required from the component providers 7. At step S5, the component providers 7 return the requested functional components. As mentioned previously, functional components may be hosted at the interface generator 6 itself, so it may not be necessary in all cases to carry out steps S4 and S5 to retrieve functional components from the component providers 7.

Once all the functional components that have been selected by the web site owner 5 are available to the interface generator 6, the interface generator 6 generates a user interface which contains the selected functional components. During the process of generating the user interface, the interface generator 6 may use content from the existing web page at "www"".bobspizzashop.""com". This content has been identified by the interface generator 6 during the analysis of the web page. For example, during the generation of the user interface, the interface generator may incorporate content regarding an address or a telephone number into functional components. Moreover, the interface generator 6 may use content regarding the web site owner 5, such as the title of the organisation or a logo, for presentational purposes, such as the title 21 illustrated in FIG. 2.

Once generated the user interface is stored, for example at an IP address associated with the internet domain name "www"".bobspizzashop.""mobi", so that it may be accessed in future. In the preferred embodiment, the user interface is stored by the interface generator 6, but one skilled in the art will recognise that the user interface could be stored elsewhere without compromising the functionality of the present invention.

At step S7 the mobile communication device 2 sends a request for the user interface to the interface generator 6. For example, this request may take the form of a hypertext transfer protocol (HTTP) request initiated when a user of the mobile communication device 2 browses to the internet domain name "www"".bobspizzashop.""mobi". At step S8, the user interface is returned to the mobile communication device 2.

The user interface is then displayed on the mobile communication device, as illustrated in FIG. 2. The selected functional components 22 to 29 are displayed in a two-dimensional array, and are each graphically represented by an icon with a description placed below.

The user of the mobile communication device 2 may select one or more of the functional components and in doing so cause the mobile communication device 2 to carry out one or more tasks, at step S9. As described above with reference to FIG. 2, these tasks may vary according to the requirements of the user. For example, the task may be the display a map showing the location of the web site owner, or may be the retrieval of a web page, such as that hosted at "www"".bobspizzashop.""com".

Once the user interface has been generated, it can be accessed on repeated occasions by different mobile communication devices. After a period of time, the web site owner 5 may wish to update the user interface, for example to include functional components that have been developed since the user interface was generated. In this case, the web site owner will send a request to update the user interface to the interface generator, at step S10. At step S11, the interface generator will provide a menu of available functional components to the web site owner 5 in a manner analogous to step S2. As suggested above, the menu of functional components provided at step S11 may or may not be the same as that provided at step S2, for example, because further functional components have been developed. As for the menu of functional components provided at step S2, the menu of functional components provided at step S11 may depend on one or more characteristics of the web site owner 5.

The web site owner 5 can then select which functional components it would like to include in the user interface. In one example, the menu of functional components provided at step S11 will include an indication of the functional components the web site owner had previously chosen at step S5. This will assist the web site owner in assessing how to update the user interface. Again, the decision the web site owner 5 makes at this stage may depend on a number of factors, such as the cost of individual functional components or the intended users of the user interface.

Having made a decision as to which functional components to include in the user interface, the web site owner 5 returns an indication of this decision to the interface generator, at step S12. This step is analogous to step S3 above.

At step S13, the interface generator 6 updates the user interface using the indication of desired functional components provided at step S12. This may involve removing functional components from the user interface or adding them to the user interface, according to the preference expressed by the web site owner 5. The skilled person will appreciate that, if required, the interface generator 6 may retrieve functional components from the component generators, as described above with reference to steps S4 and S5.

The mobile communication device 2 may then access and use the updated user interface in the same manner as described with reference to steps S7 to S9.

The present invention therefore provides a way of generating and maintaining a user interface that may be accessed by a mobile communication device 2. This allows an entity, such as a web site owner 5, to communicate with users in a more effective manner than previously possible.

The described embodiments of the invention are only examples of how the invention may be implemented. Modifications, variations and changes to the described embodiments will occur to those having appropriate skills and knowledge. These modifications, variations and changes may be made without departure from the scope of the invention defined in the claims and its equivalents.

The invention claimed is:

1. Apparatus for generating a user interface for display by a mobile communication device, the apparatus comprising a server configured to:
  retrieve a web page associated with a first internet domain name;
  analyze the web page to locate content of the web page, the content associated with a plurality of functions pertaining to the web page;
  generate a web resource providing a menu including one or more functional components associated with one or more of the plurality of functions, wherein the one or more functional components, when included in the user interface displayed by the mobile communication device, are selectable from the menu by a user of the mobile communication device to cause the mobile communication device to carry out a requested function of the plurality of functions, and the generation of the web resource is based at least in part on a result of analyzing the web page; and
  generate the user interface including the one or more functional components, the one or more functional components including the requested function,
  wherein the user interface is subsequently used by the mobile communication device to access at least a portion of the plurality of functions based at least in part on a selection of the requested function from the user interface.

2. The apparatus according to claim 1, wherein the server is configured to analyze an existing web resource, and to include content from the existing web resource in the generated user interface.

3. The apparatus according to claim 1, wherein the server is configured to receive a further indication that a further functional component of the one or more functional components in the menu is/are selected for inclusion in the user interface and to update the user interface to include the further functional component based on the received further indication.

4. The apparatus according to claim 1, wherein the server is configured to request a payment in dependence on the selected functional component(s).

5. The apparatus according to claim 1, wherein the requested function is a task comprising initiating an application hosted by the mobile communication device.

6. The apparatus according to claim 5, wherein the user interface is displayed by a first application hosted by the mobile communication device and the task comprises initiating a second application hosted by the mobile communication device.

7. The apparatus according to claim 1, wherein the requested function is a task comprising initiating a telephone call.

8. The apparatus according to claim 1, wherein the requested function is a task comprising displaying a location on a map.

9. The apparatus according to claim 1, wherein the requested function is a task comprising creating an email.

10. The apparatus according to claim 1, wherein each of the one or more functional components is represented by a graphical element within the user interface, each graphical element being displayed in an array.

11. The apparatus according to claim 10, wherein each graphical element comprises an icon.

12. A method for generating a user interface for display by a mobile communication device, the method comprising the server performing the steps of:
  retrieving a web page associated with a first internet domain name;
  analyzing the web page to locate content of the web page, the content associated with a plurality of functions pertaining to the web page;
  generating a web resource providing a menu including one or more functional components associated with one or more of the plurality of functions, wherein the one or more functional components, when included in the user interface displayed by the mobile communication device, are selectable from the menu by a user of the mobile communication device to cause the mobile communication device to carry out a requested function of the plurality of functions, and the generation of the web resource is based at least in part on a result of analyzing the web page; and
  generating the user interface including the one or more functional components, the one or more functional components including the requested function,
  wherein the user interface is subsequently used by the mobile communication device to access at least a portion of the plurality of functions based at least in part on a selection of the requested function from the user interface.

13. The method according to claim 12, further comprising the server performing the step of analyzing an existing web resource, and wherein content from the existing web resource is included in the generated user interface.

14. The method according to claim 12, further comprising the server performing the steps of:
  receiving a further indication that a further functional component of the one or more functional components in the menu is/are selected for inclusion in the user interface; and
  updating the user interface to include the further functional component based on the received further indication.

15. The method according to claim 12, further comprising the server performing the step of requesting a payment in dependence on the selected functional component(s).

16. The method according to claim 12, wherein the requested function is a task comprising initiating an application hosted by the mobile communication device.

17. The method according to claim 16, wherein the user interface is displayed by a first application hosted by the mobile communication device and the task comprises initiating a second application hosted by the mobile communication device.

18. The method according to claim 12, wherein the requested function is a task comprising initiating a telephone call.

19. The method according to claim 12, wherein the requested function is a task comprising displaying a location on a map.

20. The method according to claim 12, wherein the requested function is a task comprising creating an email.

21. The method according to claim 12, wherein each of the one or more functional components is represented by a graphical element within the user interface, each graphical element being displayed in an array.

22. The method according to claim 21, wherein each graphical element comprises an icon.

23. A non-transitory computer readable medium storing computer program code adapted to carry out the method of claim 12 when executed by a computer.

24. The method according to claim 12, further comprising the server performing the steps of:
- delivering the web resource; and
- receiving an indication that at least some of the one or more functional components in the menu is/are selected for inclusion in the user interface,
- wherein generating the user interface is based at least in part on the received indication.

25. The method according to claim 12, further comprising the server performing the steps of:
- receiving a request for the user interface from the mobile communication device; and
- delivering the user interface to the mobile communication device for display by the mobile communication device.

26. The method according to claim 12, further comprising the server performing the step of:
- storing the user interface at an IP address associated with a second internet domain name that shares one or more elements with the first internet domain name.

27. The apparatus according to claim 1, wherein the server is further configured to:
- deliver the web resource; and
- receive an indication that at least some of the one or more functional components in the menu is/are selected for inclusion in the user interface,
- wherein generating the user interface is based at least in part on the received indication.

28. The apparatus according to claim 1, wherein the server is further configured to:
- receive a request for the user interface from the mobile communication device; and
- deliver the user interface to the mobile communication device for display by the mobile communication device.

29. The apparatus according to claim 1, wherein the server is further configured to:
- store the user interface at an IP address associated with a second internet domain name that shares one or more elements with the first internet domain name.

\* \* \* \* \*